July 29, 1947.   T. S. BURNS   2,424,599

WEEDLESS FISHHOOK GUARD

Filed Oct. 23, 1943

Inventor

Thomas Steven Burns

By Clarence A. O'Brien
and Harvey B. Jacobson
Attorneys

Patented July 29, 1947

2,424,599

UNITED STATES PATENT OFFICE 2,424,599

WEEDLESS FISHHOOK GUARD

Thomas Steven Burns, Chicago, Ill.

Application October 23, 1943, Serial No. 507,422

2 Claims. (Cl. 43—38)

This invention relates to new and useful improvements in fish hooks and more particularly to a guard for preventing the hook from being caught in weeds while casting or trolling.

The principal object of the present invention is to provide a small inexpensive guard which can be readily applied to a standard fish hook for the purpose of preventing the hook from being caught in weeds and other obstacles.

Other objects and advantages of the invention will become apparent to the reader of the following description.

Figure 1:
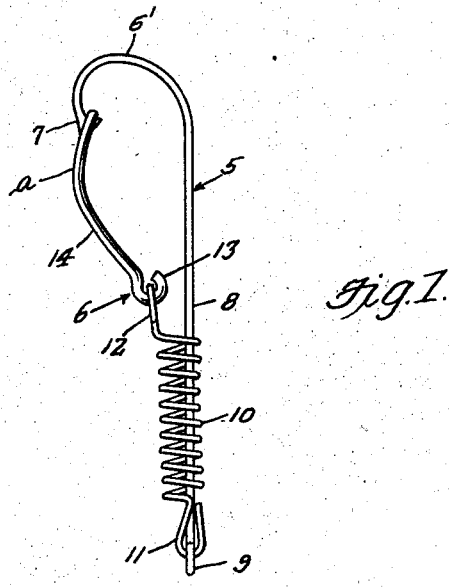
Figure 1 represents a side elevational view showing the guard applied to a hook.
Figure 2:
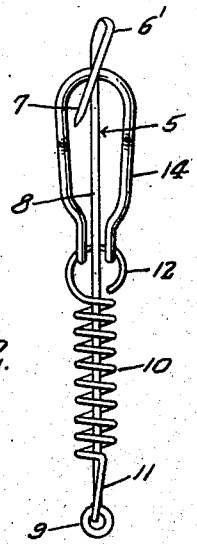
Figure 2 is a front elevational view showing the guard applied to a hook.

Referring to the drawings wherein like numerals designate like parts, it can be seen that numeral 5 generally refers to a standard fish hook, while numeral 6 generally refers to the improved guard.

The standard fish hook 5 consists of a hook head 6' having a barbed point 7 and a shank 8 usually provided with a line attachable eye 9.

The guard 6 consists of an elongated tension spring 10 having a safety snap hook 11 at one end for engaging the eye 9 and an eye 12 at its opposite end for disposition over the small hooks 13 at the free ends of a substantially U-shaped element 14, the bight portion of which is curved as at a and disposed over the barbed point 7.

Thus it will be seen, that the guard element 14 will protect the point 7 against being caught in any obstacle, especially in view of the curved disposition of its bight portion.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In combination, a fish hook, an elongated helical tension spring encircling the shank of the hook, one end of the spring being attached to the inner end of said shank, and an angular guard loop attached to the other end of said spring, said guard element being disposed over and yieldingly maintained in engagement with the barbed point of the fish hook by said spring.

2. In combination with a fish hook, an elongated helical tension spring encircling the shank portion of the fish hook and attached at one end to the inner end of said shank portion, and a U-shaped guard element attached at its ends to the other end of the spring, the bight portion of said guard element being engageable behind the barbed point of the fish hook when the spring is placed under tension, the bight portion of the guard element being disposed at an angle to its end portions.

THOMAS STEVEN BURNS.

REFERENCES CITED

The following references are of record in the file of this patent:

UNITED STATES PATENTS

| Number | Name | Date |
| --- | --- | --- |
| 915,707 | Sheward | Mar. 16, 1909 |
| 889,356 | Carpenter | June 2, 1908 |
| 1,869,111 | McLaughlin | July 26, 1932 |
| 1,166,529 | Kruse | Jan. 4, 1916 |